July 28, 1970   H. KERBER, JR   3,521,734
ARTICLE PICKUP MACHINE FOR RAISIN TRAYS AND THE LIKE
Filed Aug. 21, 1968   3 Sheets-Sheet 1

HENRY KERBER, Jr
INVENTOR

Huebner & Worrel
ATTORNEY.

HENRY KERBER, JR
INVENTOR

Huebner + Worrel
ATTORNEYS

HENRY KERBER, JR
INVENTOR

Huebner & Worrel
ATTORNEY.

United States Patent Office 3,521,734
Patented July 28, 1970

3,521,734
ARTICLE PICKUP MACHINE FOR RAISIN
TRAYS AND THE LIKE
Henry Kerber, Jr., 5175 E. North Ave.,
Fresno, Calif. 93706
Filed Aug. 21, 1968, Ser. No. 754,346
Int. Cl. B65g 65/06
U.S. Cl. 198—9   6 Claims

ABSTRACT OF THE DISCLOSURE

An article pickup machine for raisin trays and the like having an elongated upwardly inclined conveyor mounted for earth traversing movement including a lifting member disposed in forward extension from the conveyor in earth penetrating lifting relation to raisin trays encountered incident to said ground traversing movement of the conveyor and means on the frame providing movable walls laterally adjacent to said lifting member for funneling said trays onto said lifting member and for directing them rearwardly in a rectilinear path substantially longitudinally aligned with the conveyor.

BACKGROUND OF THE INVENTION

Harvested grapes which are intended for processing into raisins are initially laid on paper trays between the rows of vines in a vineyard for drying by the sun. After drying, the four side edges of the trays are folded and wrapped about the contents, or rolled, completely to encapsulate the dried grapes for subsequent curing and so as to preclude inadvertent spillage during subsequent handling operations. Such harvesting and tray handling procedures are conventionally accomplished by hand labor. As a result, the trays are usually not precisely located in a desired longitudinally aligned position centrally of the rows. If such folding operation has been particularly carelessly performed, the folded trays may be indiscriminately and widely scattered along the rows between the vines. Consequently, prior attempts to mechanize the pickup operation have not been entirely successful in view of the difficulty in gathering such widely spaced trays. The prior machines are conventionally constructed having a width substantially corresponding to the spacing between the adjacent vines in the vineyard. However, such vine spacing frequently varies between vineyards so that such prior machines could not be universally employed. These machines have consisted of an elongated upwardly rearwardly inclined mobile conveyor having a lower forward end disposed forwardly adjacent to the ground. A plurality of forwardly extended tines are mounted in laterally spaced relation on the forward end of the conveyor. The tines are forwardly and downwardly inclined and provide outer ends in earth engagement for directing the trays rearwardly onto the conveyor incident to forward earth traversing movement of the machine. Because of the substantial width of such machines, they require precise maneuvering during their travel through the vineyards to avoid damage to the vines. However, in many instances where the vines project into the rows, it has been impossible to avoid entanglement and damage to the vines. Furthermore, the rows between the vines frequently have grass, weeds, and other growth therein which is uprooted and accumulated on the tines of the machine which impedes the free sliding movement of the trays rearwardly toward the conveyor. The accumulated grass and the like further causes the trays to tumble rearwardly and, in many instances, to unwrap thus spilling their contents prior to reaching the conveyor. This problem is aggravated by the relatively large number of tines extended substantially completely across the row which, of course, encounters all the grass and any other debris disposed therein.

SUMMARY OF THE INVENTION

Accordingly, it is an object of the present invention to provide an improved article pickup machine for raisin trays and the like.

Another object is to provide such an improved article pickup machine which is effective to pick up articles which are not disposed in precisely aligned relation on the ground without requiring extensive deviation or maneuvering of the machine from a substantially straight path of travel.

Another object is to provide an improved article pickup machine which minimizes the intermixing of extraneous matter with the articles picked up from the ground.

Another object is to provide an improved article pickup machine which is adapted to be universally employed irrespective of the spacing between the vines in the vineyard.

Another object is to provide an article pickup machine which is effective to lift and transport the articles in a substantially upright attitude and which minimizes or precludes tumbling of the articles during the pickup operation.

Another object is to provide an improved article pickup machine which utilizes a relatively narrow elevating conveyor on which is mounted a pair of power driven article funneling members which are effective to direct articles into substantial precise alignment with the conveyor.

Another object is to provide an article pickup machine which utilizes an article lifting member in longitudinally aligned forwardly extended relation from the conveyor which has a single earth engaging point to permit the free flow of soil, grass and other extraneous material therepast to preclude accumulation of such debris upon the lifting member and to avoid intermixing of such material with the articles being picked up.

Other objects and advantages of the present invention will subsequently become more clearly apparent upon reference to the following description and accompanying drawings.

BRIEF DESCRIPTION OF THE DRAWINGS

FIG. 1 is a side elevation of an article pickup machine embodying the principles of the present invention shown mounted in trailing relation on a prime mover, such as a tractor, in an operating position aligned with a row of articles to be picked up such as raisin trays and the like.

DESCRIPTION OF THE PREFERRED EMBODIMENT

Figure 1:
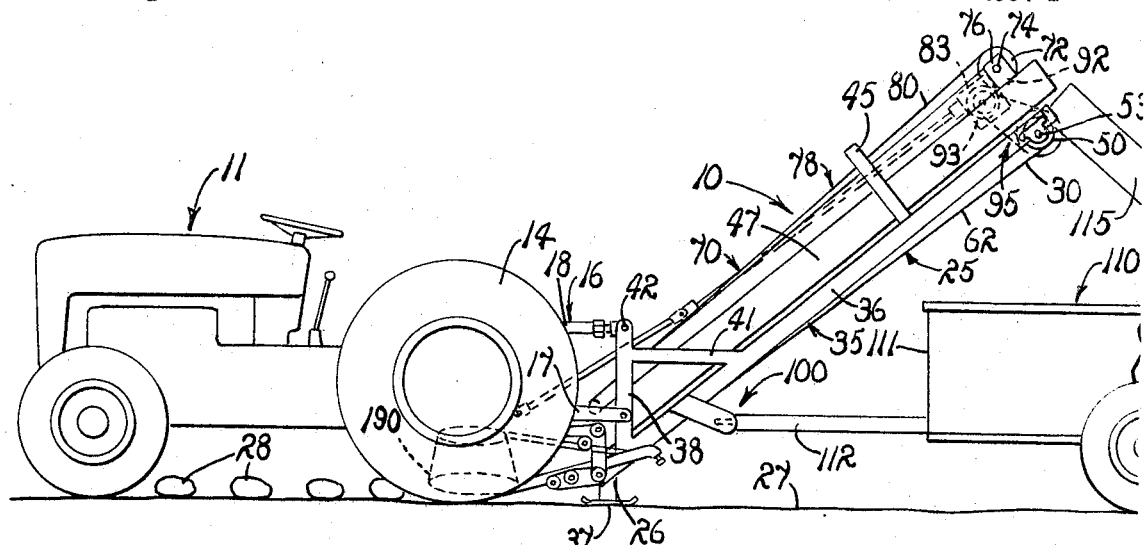

Referring more particularly to the drawings, an article pickup machine embodying the principles of the present invention is indicated in FIG. 1 by the reference numeral 10 rearwardly mounted on a prime mover represented by a tractor 11. The tractor includes a rear housing 12 supported by a pair of ground engaging drive wheels 14. The rear housing of the tractor mounts a conventional three-point hitch, generally indicated by the reference numeral 16, having a pair of lower links, one of which is shown at 17, and a centrally disposed upper link 18. The lower link is connected to a powered lifting arm 19 on the tractor housing by a connecting link 20 pivotally mounted intermediate the ends of the lower link 17. A power takeoff shaft 22 is rearwardly extended from the tractor housing 12 between the lower links 17.

The article pickup machine 10 of the present invention provides an elongated upwardly inclined main article elevating conveyor 25 having a lower article receiving end 26 disposed in closely spaced relation to a supporting ground surface 27. The elevating conveyor is disposed in substantially longitudinally aligned relation with a row of spaced articles 28, such as raisin trays or the like, disposed upon the ground surface between a pair of adjacent rows of grapevines, not shown. The elevating conveyor further includes an elevationally spaced upper article discharging end 30.

The main article elevating conveyor 25 is mounted on an elongated frame 35 having a pair of elongated laterally spaced substantially parallel channular support rails 36 extended between the upper end 30 and the lower end 26 of the elevating conveyor. A pair of conveyor support shoes 37 are individually mounted on the rails in depending relation from the lower end of the conveyor. The support rails are maintained in their described parallel and upwardly inclined position behind the tractor 11 by a A-frame 38 having an upper apex 39 and laterally spaced opposite depending legs 40. The lower ends of the legs are individually rigidly secured, as by welding or the like, to the support rails closely adjacent to the lower end 26 of the elevating conveyor. The elevating conveyor mounting is strengthened by a pair of substantially horizontally disposed braces 41 having forward ends welded to the legs of the A-frame adjacent to the upper apex portion 39 and opposite rearward ends individually welded to their respectively associated support rails in spaced relation from the lower end of the conveyor.

The upper apex 39 of the A-frame is pivotally mounted on the rearward end of the upper link 17 of the three-point hitch 16 by a pivot pin 42 and the rearward ends of the lower links 17 are pivotally connected to the lower legs 40 of the A-frame closely adjacent to the lower end of the elevating conveyor by pivot pins 43. Accordingly, upon actuation of the powered arm 19, the three-point hitch and A-frame can be raised or lowered elevationally to position the elevating conveyor with respect to the ground surface 27.

The lateral spacing between the support rails 36 of the elevating conveyor frame 35 is maintained adjacent to their upper ends by an inverted substantially U-shaped bridging member 45 having lower ends rigidly secured to the rails, as by welding or the like. A pair of elongated side walls 47 are disposed in substantially individually upright planes coextensively along the support rails 36. The side walls are secured to their respective rails by bracket and bolt assemblies 48 longitudinally spaced along the rails and by being weldably connected to the opposite sides of the bridging member 45.

A pair of upper and lower conveyor rollers 50 and 51, respectively, are journalled at their corresponding ends of the main article elevating conveyor 25 individually on a pair of shafts 53 and 54, respectively, between the side rails 36 of the frame 35. The lower shaft 54 includes outer end portions 55 which are laterally outwardly extended through elongated slots 56 in the support rails at the lower end 26 of the elevating conveyor for a purpose hereinafter to be more fully described. An elongated conveyor belt 60 of suitable resiliently flexible material is mounted for circuitous movement about the upper and lower rollers 50 and 51 between the support rails 36. The belt provides opposite upper and lower runs 61 and 62, respectively, on which are mounted a plurality of longitudinally spaced transversely extended flight bars 64 constructed of a resilient material such as rubber or the like so as to minimize damage to the raisin trays 28.

An elongated upper tray compressing conveyor 70 is mounted in upwardly spaced substantially parallel relation to the main article elevating conveyor 25 substantially coextensive with the upper edge of the side walls 47. The upper compressing conveyor includes upper and lower rollers 72 and 73 which are individually rotatably mounted on a pair of shafts 74 and 75, respectively, journaled in the side walls in respectively associated bearing blocks 76 and 77. The compressing conveyor further includes an elongated endless belt 78 of resiliently flexible material disposed for circuitous movement about the upper and lower rollers and which has spaced upper and lower runs 80 and 81, respectively.

The conveyors 25 and 70 are simultaneously driven from a transfer gear box 83 mounted at the upper end of the elevating conveyor 25 from a drive train, generally indicated by the reference numeral 85, extended from the power take-off 22 of the tractor 11. The drive train includes an elongated power shaft 86 rotatably mounted on one of the side walls 47 by spaced bearing blocks 87. An angularly disposed drive shaft 88 provides a forward end having a universal joint 89 connected to the power take-off and a rearward end having a universal coupling 90 connected to the power shaft 86.

As best shown in FIG. 1, a drive gear 92 on the gear box 83 is disposed in driving meshing relation with a drive gear 93 on the upper roller shaft 74 to drive the upper article compressing conveyor 70 in a counterclockwise direction. The drive to the lower main article elevating conveyor 25 is accomplished by a chain and sprocket assembly, generally indicated by the reference numeral 95, which is effective to drive the lower elevating conveyor in a clockwise direction so that the upper run 61 thereof is traveled in a substantially rectilinear path of movement in the same direction as the lower compressing run 81 of the upper compressing conveyor 70.

A trailer hitch, generally indicated by the reference numeral 100, is rearwardly extended from the conveyor frame 35 and provides a pair of rearwardly extended arms 102 welded to the support rails 36. The arms rearwardly terminate in ends 103 disposed in laterally spaced substantially parallel relation. A drawbar plate 105 is secured in interconnecting relation between the rearward ends of the arms and has a pin-receiving bore 106 extended therethrough. The drawbar is adapted to provide a connection for a trailer 110 which is to be drawn behind the article pickup machine 10 of the present invention. The trailer includes an open body 111 having a forwardly extended tongue 112 releasably connectable to the drawbar. The trailer is disposed below the upper article discharging end 30 of the elevating conveyor which has a downwardly inclined tray conveying chute 115 adjustably mounted thereon for directing the raisin trays elevated by the elevating conveyor into the body of the trailer.

Figure 7:
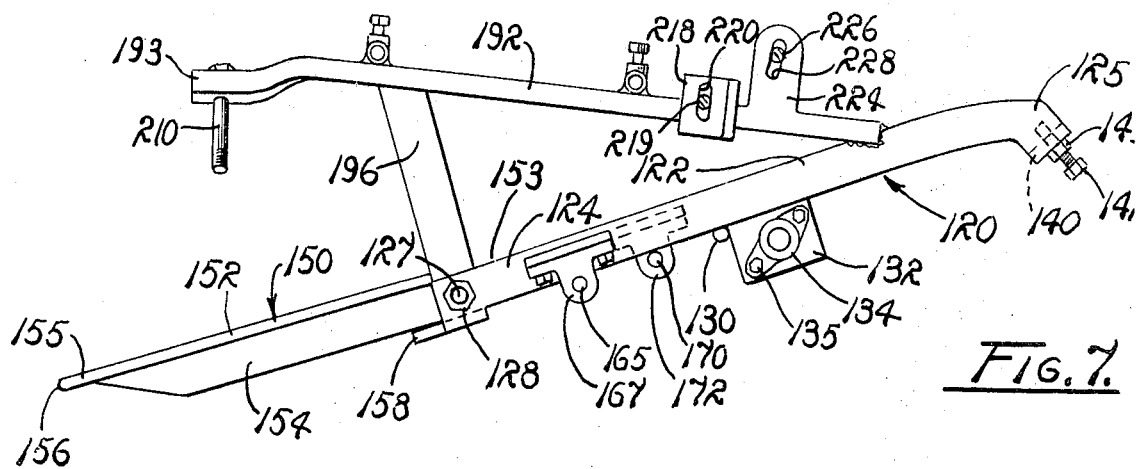
FIG. 7 is a somewhat enlarged side elevation of the article pickup frame removed from the conveyor frame.

An article pickup frame, generally indicated by the reference numeral 120, is pivotally mounted on the forwardly disposed lower end of the elevating conveyor 25. The frame is best shown in FIG. 7 providing a pair of opposite laterally spaced substantially parallel support arms 122 having opposite forward and rearward ends 124 and 125, respectively. The forward ends of the support arms are interconnected by an elongated cross shaft 127 having opposite screw-threaded ends extended through the arms and secured thereto by inner and outer lock nuts 128. The support arms are also interconnected by an elongated cross rod 130 extended therebetween having opposite ends secured to the arms, as by welding or the like, in closely forwardly spaced relation to the lower end 26 of the conveyor 25.

Each of the support arms 122 has a bearing plate 132 depending therefrom intermediate its ends on which is mounted a bearing block 134 rotatably receiving its associated extended end 55 of the roller shaft 54. The bearing block is constrained on the plate by a pair of bolts 135 extended through the support arm and into a spacer plate 136 disposed on the opposite inner side of the support arm between the support arm and the support rail 36. A similar spacer plate 138 is disposed on the opposite side of the support rail between the rail and the roller 51.

Each of the rearward ends 125 of the support arms 122 includes an inwardly extended bracket 140 disposed in underlying relation to its associated support rail 36. An elongated adjusting bolt 142 is screw-threadably extended through the bracket for engagement with the support rail and is held in the desired adjusted position by a lock nut 143 so as to adjust the angular relationship between the pickup frame 120 and the frame 35 of the main article conveyor 25. Accordingly, the adjusting bolt and support rail serves as a stop member for determining the maximum downward inclination of the pickup frame but permits the forward end of the frame upward pivotal movement about the roller shaft 54 in floating relation upon the ground surface 27.

An elongated conveyor belt adjusting screw 146 is screw-threadably mounted upon the side of each of the support rails 36 by a bracket 147. The forward end of the adjusting bolt engages the rearward surface of the outer spacer plate 136 which is effective to move the roller shaft 54 through the elongated slot 56 in the support rails which moves the roller 51 forwardly therewith in belt-tensioning relation. It is noted that during such belt-tensioning adjustment, the entire pickup frame 120 is concurently moved in a forward direction outwardly from the lower end of the conveyor 25.

Figure 3:
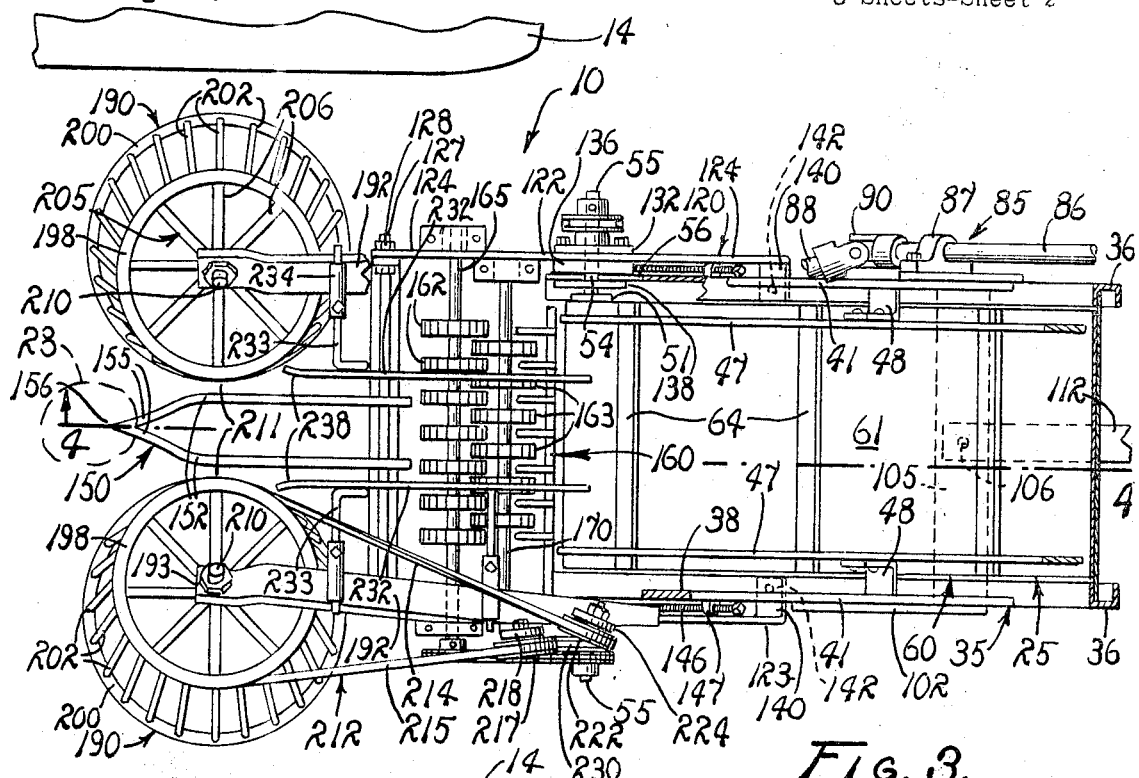
FIG. 3 is a somewhat enlarged top plan view of the article pickup machine, as shown in FIG. 2.
Figure 5:
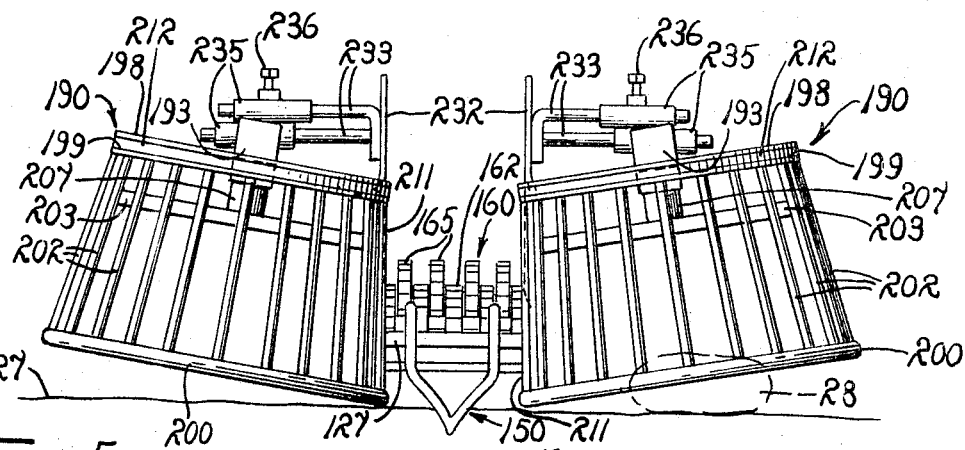
FIG. 5 is a somewhat enlarged front elevation of the article pickup machine showing a pair of article funneling members disposed in front of the article lifting conveyor.

An elongated raisin tray lifting member 150 is forwardly extended from the pickup frame 120. The lifting member provides a pair of elongated rod-like tines 152 disposed in spaced substantially parallel relation to each other having rearward ends 153 pivotally mounted on the cross shaft 127 of the frame. Each of the tines has an elongated strengthening rib or fin 154 and forwardly converging forward ends 155 which are interconnected, as by welding or the like, at a forward earth-engaging point 156. The tines are rested upon a pair of stop members 158 on the cross shaft 127 limiting downward movement of the tines relative to the pickup frame but permitting upward floating movement of the tines in conforming relation to elevations and depressions encountered in the ground surface 27. As best shown in FIGS. 3 and 5, the point 156 of the tines 152 is disposed substantially upon the longitudinal center line of the machine and is transversely constrained in such position by suitable stop members, not shown, on the cross shaft 127.

A tray transfer mechanism, generally indicated by the reference numeral 160, is disposed within the pickup frame 120 between the rearward ends of the tines 152 and the lower end 26 of the main article conveyor 125. The transfer mechanism provides a pair of sets of forwardly and rearwardly disposed peripherally toothed drive wheels 162 and 163. The forward drive wheels 162 are mounted in axially spaced relation along a support shaft 165 having opposite ends extended through the arms 122 of the pickup frame for rotation within bearing blocks 167 mounted on the outer surfaces of the arms. With the drive wheels 162 disposed in the described axially spaced relation, a plurality of interstices 168 are formed therebetween.

Figure 4:
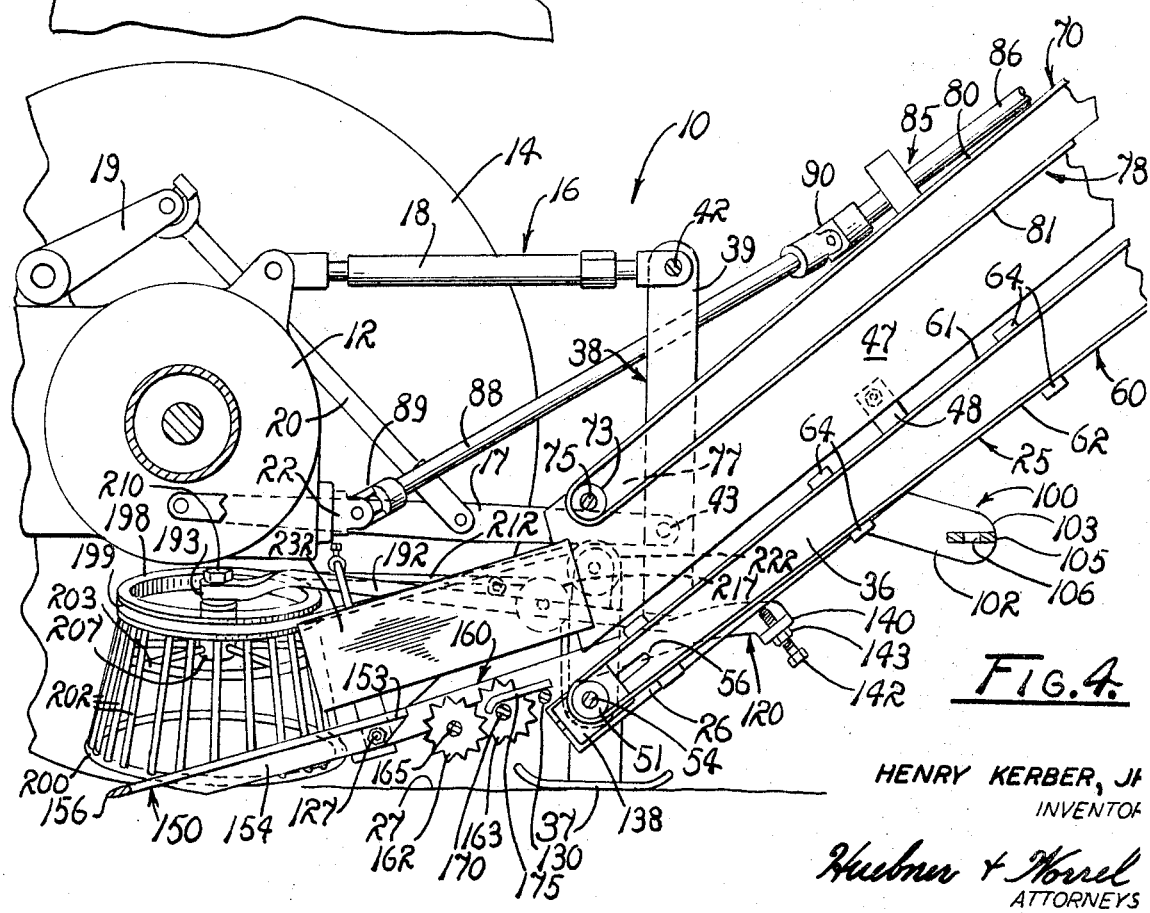
FIG. 4 is a somewhat enlarged longitudinal vertical section through the article pickup machine, taken generally along the line 4—4 of FIG. 3.

The rearward drive wheels 163 are similarly mounted upon a support shaft 170 in axially spaced relation with the ends of the shaft journaled in bearing blocks 172 mounted on the inner surfaces of the arms 122. The shaft 170 is disposed in rearwardly spaced substantially parallel relation to the shaft 165 with the drive wheels 163 disposed in axially overlapping relation with the drive wheels 162 by the extension of their forward peripheries into the interstices 168. Similarly, the drive wheels 163 provide axially spaced interstices 173 therebetween which receive the rearward peripheries of the forward drive wheels 162. As best shown in FIG. 4, the upper peripheries of the drive wheels 162 and 163 are disposed in a plane substantially aligned with the plane of the tines 152 of the lifting member 150. The tray transfer mechanism 160 further includes a plurality of bridging rods 175 which are mounted in axially spaced relation along the cross rod 130, as by welding or the like. The rods are forwardly extended into the interstices 173 between the rearward set of drive wheels 163 and rearwardly above the lower end of the elevating conveyor 25.

Figure 2:
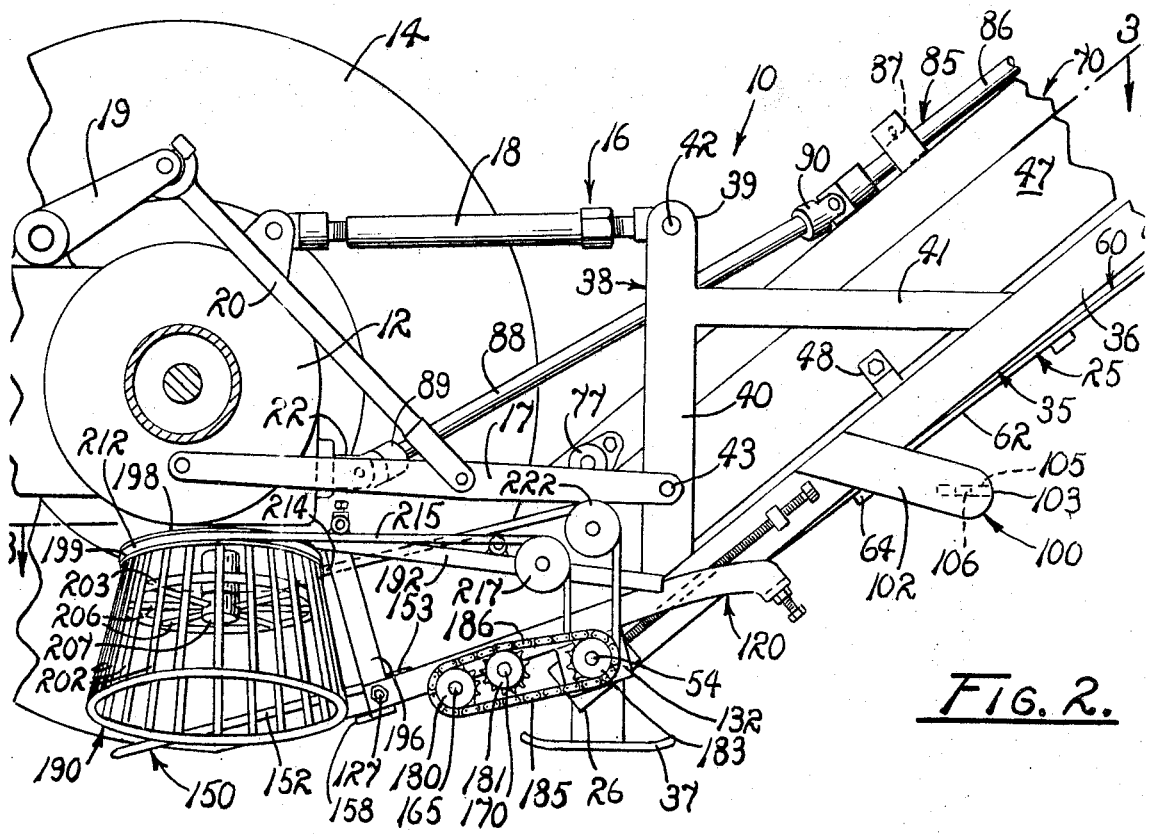
FIG. 2 is a somewhat enlarged fragmentary side elevation of the article pickup machine of FIG. 1.

Each of the outer ends of the support shafts 165 and 170 at the left-hand side of the pickup frame, as shown in FIGS. 2 and 3, mounts a sprocket 180 and 181, respectively, in substantially coplanar relation with a drive sprocket 183 on the extended end 55 of the conveyor roller shaft 54. An elongated endless chain 185 is mounted in circumscribing relation about the forward sprocket 180 and the drive sprocket 183 and provides an upper run 186 in meshing relation with the upper periphery of the rearward sprocket 181. Accordingly, the drive wheels 162 and 163 are rotated in the same direction by the elevating conveyor 25 so that their upper peripheries are moved in a rearward direction for receiving trays from the lifting member and transferring them to the lower receiving end of the conveyor.

A pair of tray centering or funneling baskets 190 are mounted in forward extension from the pickup frame 120 in laterally opposed relation on opposite sides of the lifting member 150. The baskets are individually rotatably supported on a pair of elongated support arms 192 having rearward ends individually secured to their respectively associated support arms 122 of the pickup frame closely adjacent to the rearward ends of the support arms, as by welding or the like. The arms are forwardly upwardly divergently extended from the arms 122 and terminate in angularly twisted forward ends 193. The basket support arms are further supported in the described position by substantially upright braces 196 secured at their opposite ends, as by welding or the like, between the arms 122 and 192.

Each of the tray funneling baskets 190 is of substantially frusto-conical configuration and has an upper circular edge formed bp a circular ring 198. The upper ring has a V-shaped externally peripherally disposed groove 199. The basket includes an opposite lower edge provided by a circular ring 200 of a diameter somewhat larger than the diameter of the upper ring 198. A plurality of elongated side rods 202 are disposed in circumferentially spaced interconnecting relation between the upper and lower rings. A strengthening ring 203 is disposed in interconnecting relation between the side rods in spaced substantially parallel relation between the upper and lower rings of the basket.

A spider or web 205 is disposed within the ring 203 providing a plurality of radially extended spokes 206 supporting a hub 207. The hub and basket are mounted for rotation on the support arm 192 by an axle bolt 210 extended through the hub and through the forward end of the arm 192. It is noted that the baskets are tipped from a vertical position by the angularly twisted configuration of the forward ends of the arms transversely to rock the baskets so that only the inner peripheral portion of the lower ring is disposed in earth engagement thereby to present a minimum of drag resisting rotation. It is further noted that in such tipped position, the baskets provide substantially upright laterally spaced parallel side walls 211 at their inner peripheries on opposite sides of the lifting member 150.

Figure 6:
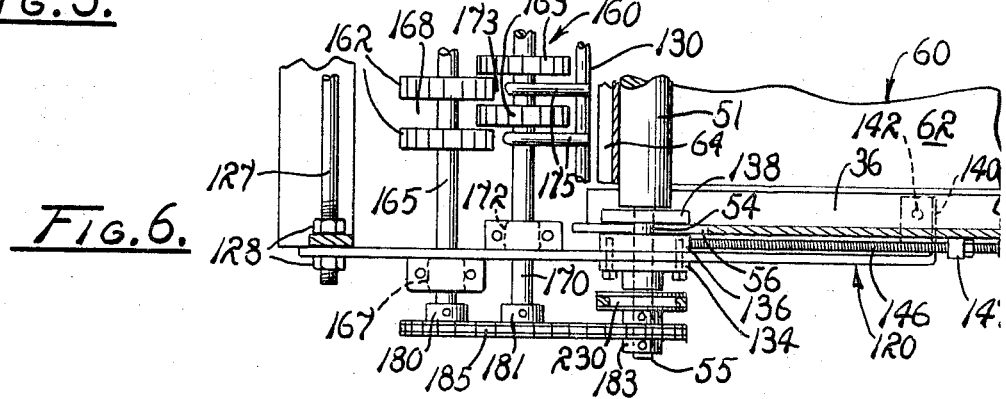
FIG. 6 is a somewhat enlarged fragmentary longitudinal section, taken generally along the line 6—6 of FIG. 2, showing an adjustable pivot connection between the conveyor frame and the article pickup frame.

Each of the baskets is power driven by an elongated V-belt 212 trained about the groove 199 of the upper ring 198 which is rearwardly extended therefrom to provide opposite inner and outer runs 214 and 215, respectively. As best shown in FIGS. 2 and 3, the outer run 215 of the V-belt is trained rearwardly over and is downwardly extended from a pulley 217 mounted on a bracket 218 on the rearward end of the support arm 192. The pulley includes a mounting shaft 219 which is adjustably mounted within an elongated slot 220 in the bracket for belt-tightening purposes. The inner run 214 of the V-belt is trained over and downwardly extended from a pulley 222 mounted in an angularly related plane to the support arm 192 by a bracket 224 upwardly extended from the arm. The pulley 222 has a shaft 226 which is mounted in an elongated slot 228 on the bracket 224 for further belt-tightening adjustment. The depending loop portion of the V-belt is trained about a drive pulley 230 on the lower conveyor drive roller 54 which, as best shown in FIG. 6, is disposed between the outer drive sprocket 183 and the arm 122 of the pickup frame 120. As best shown in FIG. 4 the V-belt on the opposite side of the machine from the side shown in FIG. 2 has its inner run 214 engaging the pulley 217 and its outer run 215 engaging the pulley 222 in order to drive the adjacent inner side walls 211 of the baskets 190 in the same rearward direction.

A pair of tray guide walls 232 are disposed in substantially upright symmetrical relation on opposite sides of the longitudinal center line of the machine immediately above the rearward ends of the tines 152 of the lifting member 150 and the tray transfer mechanism 160 and the lower end 26 of the conveyor 25. The side walls are individually supported by a pair of longitudinally spaced rods 233 which are adjustably axially extended through a pair of mounting sleeves 235 secured, as by welding or the like, to the upper surface of the basket support arms 192. A locking bolt 236 is screw-threadably mounted on each of the sleeves for manipulation into wedging engagement against their respective rods to hold them in the desired adjusted position. The side walls provide laterally outwardly flared forward ends 238 which are disposed immediately behind the funneling baskets 190 in planes substantially tangentially rearwardly aligned from the inner peripheries or upright walls of the baskets.

OPERATION

The operation of the described embodiment of the subject invention is believed to be clearly apparent and is briefly summarized at this point. During transport of the article pickup machine of the present invention to the site of use, the powered arm 19 of the three-point hitch 16 is actuated by the usual hydraulic control system on the tractor, not shown, to raise the links 17 and 18 for supporting the article pickup machine 10 in an elevated transport position. The trailer 110 is transported in trailing relation to the conveyor frame 35 by its connection with the trailer hitch 100. During such elevated transport, the forward end of the pickup frame 120 is precluded downward pivotal movement by the stop brackets 140 and the adjusting bolt 142 on the rearward ends of the arms 122 engaging the lower surfaces of the support rails 36 of the conveyor frame 35. Also, the tray lifting member 150 is precluded downward pivotal movement by the stop members 158 on the cross shaft 127.

Upon reaching the site of use, the three-point hitch is actuated to lower the article pickup machine 10 until the shoes 37 engage the surface of the ground 27 in sliding supporting relation to the conveyor frame 35. The hydraulic controls on the tractor for the three-point hitch are disposed in a float position so that during earth traversing movement of the tractor and the pickup machine, the shoes slide along the ground in conforming relation to elevations and depressions encountered. In such position, the inner peripheral portions of the lower rings 200 of the tray funneling baskets 190 are disposed in lightly skimming relation to the ground while the point 156 of the tines 152 of the tray lifting member 150 is disposed in shallow earth-penetrating relation.

Prior to the entry of the tractor 11 between the vines in the vineyard, the power take-off 22 is actuated to provide a drive to the gear box 83 on the upper end of the conveyor 25 through the power shafts 86, 88 and 90. As described, the conveyor belts 60 and 78 are simultaneously driven from the gear box 83 so that their respectively adjacent upper and lower runs are traveled in the same rearward direction and at substantially the same linear velocity. Rotation of the conveyor belt 60 also drives the lower roller shaft 54 which powers the tray transfer drive wheels 162 and 163 through the chain 185 and sprockets 180, 181 and 183. At the same time, the drive pulley 230 on the drive shaft 54 rotates the tray funneling baskets 190 so that their adjacent inner peripheral side walls 211 are also traveled rearwardly toward the lower tray receiving end of the elevating conveyor.

The tractor 11, the article pickup machine 10 and the trailer 110 are driven between the rows of vines in a vineyard in which a plurality of raisin trays 28 are disposed. Ideally, the raisin trays are located centrally along the rows in longitudinally spaced relation for successive engagement with the forward ends of the tines 152 of the lifting member 150. During continued earth traversing movement of the machine, the trays slide rearwardly upwardly upon the tines of the lifting member and are propelled rearwardly by engagement with the rotating inner side walls 211 of the baskets 190. The trays are rearwardly discharged from the tines onto the upper peripheries of the drive wheels 162 and 163 which further propel the trays rearwardly in sliding engagement over the bridging rods 175 for deposit upon the upper run 61 of the conveyor belt 60.

It is noted that during passage of the trays over the toothed upper peripheries of the drive wheels 162 and 163, any dirt or other extraneous material on the trays is shaken therefrom and is permitted to gravitate downwardly through the interstices 168 and 173 between the drive wheels prior to the deposit of the trays upon the conveyor. Accordingly, such extraneous material is precluded from mixing with the dried raisins in the trays upon their discharge at the upper end 30 of the conveyor. Furthermore, the single-point construction of the lifting member 150 and the lateral spacing of the tines 152 permit soil and other debris to flow freely over the point 156 so as to minimize the accumulation of grass and other extraneous material encountered within the rows upon the tines. Accordingly, the tines of the lifting member are maintained substantially free of any accumulation to present a smooth, substantially uncluttered sliding surface which minimizes or precludes tumbling of the trays during their rearward movement toward the conveyor. The side walls 232 of the pickup frame 120 confine the rearward movement of the trays to a substantially rectilinear path and preclude any lateral deviation therefrom.

Even when the raisin trays are not precisely centrally arranged between the rows, the pickup machine of the present invention is effective positively to reposition the trays for pickup by the tray lifting member 150. If a laterally displaced tray is disposed within the rows, such tray is initially encountered by the forward periphery of the adjacent tray-funneling basket 190. Such engagement motivates the tray rearwardly inwardly toward the longitudinal center line of the machine in position to be lifted by the lifting member 150, as previously described. The angularly tipped attitude of the baskets affords a substantially downward raking force against the trays to slide them along the ground toward the lifting member without tumbling and undesirable unwrapping of the trays.

Upon deposit of the trays upon the upper run 61 of the conveyor belt 60, the trays are engaged by the flight bars 64 to carry them upwardly with substantially no return downward sliding movement. During such upward travel, the trays are compressibly engaged from above by the lower run 81 of the upper conveyor belt 78 which avoids downward tumbling or unwrapping of the trays so as positively to avoid spillage of their contents upon the conveyor. When the trays reach the upper end 30 of the conveyor, they are discharged onto the chute 115 for gravitational descent into the hands of a workman on the trailer. The workman unwraps the trays and separates them from their contents for deposit of the contents in a suitable container either on or off the trailer. Upon reaching the end of the row, the pickup machine is easily elevated by actuation of the three-point hitch on the tractor to permit turning of the tractor for alignment with the next row after which the conveyor frame is again lowered to the described operating position with the slide shoe 37 engaging theg round 27.

Accordingly, in view of the foregoing, it is readily apparent that the structure of the present invention provides an improved pickup machine for raisin trays and the like which is adapted to be universally employed in vineyards irrespective of the spacing between the vines and the trays need not be precisely aligned with the center of the row between the vines. The rotary tray-funneling baskets dependably motivate any laterally displaced trays into precise alignment for ready pickup by the single tray lifting member which is not susceptible to the accumulation of grass and other extraneous matter thereon which substantially interferes with the rearward passage of trays in the described conventional structures. The improved machine of the present invention further minimizes the intermixing of extraneous matter with the trays prior to their deposit on the tray elevating conveyor and which avoids tumbling or unwrapping of the trays on the conveyor virtually to eliminate spillage of the contents prior to the discharge of the trays into the raisin collecting trailer.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An article pickup machine comprising a frame adapted for ground traversing movement in a predetermined forward direction along rows of articles lying on the ground; an elongated upwardly inclined conveyor mounted on said frame having a lower forwardly disposed article receiving end in closely spaced relation to the ground and an opposite upper rearwardly disposed article discharging end; an upwardly inclined article lifting member on the frame in forward extension from said article receiving end of the conveyor and in earth penetrating lifting relation to articles encountered thereon incident to said ground traversing movement of the frame; means on the frame providing movable walls laterally adjacent to said article lifting member for funneling said articles onto said lifting member and for directing them rearwardly in a rectilinear path of movement substantially longitudinally aligned with the conveyor, said article lifting member including a pair of elongated laterally spaced substantially parallel tines having rearward ends pivotally mounted on the frame to permit limited floating movement of the tines in conforming relation to the terrain traversed and opposite converging interconnected forward ends forming an earth engaging point with an opening formed rearwardly thereabove between the tines to permit the free flow of soil, grass and other debris through the lifting member so as to minimize the accumulation of debris and the like on the tines.

2. The article pickup machine of claim 1 including article transfer means on the frame between said lifting tines and said article receiving end of the conveyor providing a plurality of power driven substantially circular article drive members having toothed peripheries frictionally to engage and to propel said articles received from the lifting tines rearwardly toward the conveyor during which engagement soil, grass or other debris is shaken from the articles with the drive members being axially spaced from each other transversely of said path of movement of the articles to define interstices therebetween through which said soil, grass, and other debris from the articles is permitted to pass.

3. The article pickup machine of claim 2, wherein said means providing movable walls comprises a pair of power driven substantially cylindrical baskets having forwardly disposed peripheries tangentially related to a transverse plane spaced forwardly from said point of the tines and spaced inner peripheries arcuately converging toward said tines.

4. An article pickup machine comprising a frame adapted for ground traversing movement in a predetermined forward direction along rows of articles such as raisin trays and the like lying on the ground; an elongated upwardly inclined powered conveyor mounted on said frame in longitudinal alignment with said direction of movement and having a lower forwardly disposed article receiving end in closely spaced relation to the ground and an opposite upper rearwardly disposed article discharging end; an upwardly inclined article lifting member disposed in forwardly longitudinally extending relation from said article receiving end of the conveyor and having a pair of elongated laterally spaced substantially parallel tines providing rearward ends pivoted on the frame to permit limited floating movement of the tines in conforming relation to the terrain traversed and opposite converging interconneceted forward ends forming an earth engaging point in lifting relation to articles encountered thereon incident to said ground traversing movement of the frame with an opening formed rearwardly above the point between the tines to permit the free flow of soil, grass and other debris through the lifting member so as to minimize the accumulation of debris and the like on the tines; a pair of power driven shafts journaled in the frame in laterally extended spaced substantially parallel relation between said rearward ends of the tines and said receiving end of the conveyor; a plurality of substantially circular peripherally toothed wheels mounted on said shafts in axially spaced relation to define interstices therebetween with the wheels of each shaft extended into the interstices between the wheels of the other shaft in radially overlapping spaced relation successively frictionally to engage and to propel articles received from said lifting member toward said receiving end of the conveyor with any soil, grass or other debris mixed with the articles being permitted gravitational descent through said interstices between the wheels prior to deposit of the articles on the conveyor; and a pair of power driven substantially cylindrical baskets rotatably mounted in forwardly extended relation from the frame in spaced laterally opposed relation individually outwardly adjacent to said tines of the lifting member and providing forwardly disposed peripheries tangentially related to a transverse plane spaced forwardly from said point of the tines and inner peripheries arcuately converging toward their respectively adjacent tines affording movable walls for funneling said articles onto said lifting member and for directing them rearwardly in a path of movement substantially longitudinally aligned with the conveyor.

5. The article pickup machine of claim 4 including a pair of elongated stationary wall panels of substantially flat rigid material adjustably mounted on the frame above said rearward ends of the article lifting tines, the article transfer wheels, and the article receiving end of the conveyor in laterally adjustably spaced substantially parallel relation and in individual substantially upright planes tangentially aligned with the inner peripheries of their respectively adjacent article funneling baskets to confine said articles to said rectilinear path during their rearward movement from the tines to the conveyor.

6. The article pickup machine of claim 5 in which said article funneling baskets are frusto-conical and individually said article funneling baskets are frusto-conical and individually provide an upper circular grooved drive belt receiving edge and an opposite lower edge, and a web disposed within said upper edge of the basket mounting the basket for rotation about an axis transversely tipped from the vertical to dispose the lower edge at said inner periphery in closely adjacent skimming relation to the ground and said inner wall thereof in an upright substantially vertical attitude.

References Cited

UNITED STATES PATENTS

| 1,862,230 | 6/1932 | McDermott | 198—9 |
| 2,337,699 | 12/1943 | Walz | 171—58 |
| 2,851,143 | 9/1958 | Rosetz | 198—9 |

ANDRES H. NIELSEN, Primary Examiner

U.S. Cl. X.R.

198—103